US009173007B2

(12) United States Patent
Touret et al.

(10) Patent No.: US 9,173,007 B2
(45) Date of Patent: Oct. 27, 2015

(54) METHOD AND SYSTEM FOR SYNCHRONIZATION FOR DVB-S2 FRAME AND ITS ASSOCIATED FRAME STRUCTURE

(71) Applicant: THALES, Neuilly-sur-Seine (FR)

(72) Inventors: Marc Touret, Gennevilliers (FR); Katy Gourlaouen, Gennevilliers (FR)

(73) Assignee: THALES, Neuilly Sur Seine (FR)

( * ) Notice: Subject to any disclaimer, the term of this patent is extended or adjusted under 35 U.S.C. 154(b) by 0 days.

(21) Appl. No.: 14/139,578

(22) Filed: Dec. 23, 2013

(65) Prior Publication Data
US 2014/0196097 A1 Jul. 10, 2014

(30) Foreign Application Priority Data

Dec. 28, 2012 (FR) ...................................... 12 03616

(51) Int. Cl.
 H04N 7/20 (2006.01)
 H04J 3/07 (2006.01)
 H04N 21/643 (2011.01)
 (Continued)

(52) U.S. Cl.
 CPC ........... *H04N 21/643* (2013.01); *H04N 21/236* (2013.01); *H04N 21/2383* (2013.01); *H04N 21/23605* (2013.01); *H04N 21/4382* (2013.01); *H04N 21/6143* (2013.01); *H04N 21/6193* (2013.01); *H04N 21/6338* (2013.01); *H04L 1/0003* (2013.01); *H04L 1/0009* (2013.01); *H04L 1/0083* (2013.01); *H04L 27/0008* (2013.01); *H04L 27/22* (2013.01); *H04L 27/2656* (2013.01); *H04L 27/38* (2013.01)

(58) Field of Classification Search
 None
 See application file for complete search history.

(56) References Cited

U.S. PATENT DOCUMENTS

| 8,213,553 | B2 | 7/2012 | Zhou et al. |
| 2002/0105976 | A1 | 8/2002 | Kelly et al. |
| 2007/0248076 | A1 | 10/2007 | Ji et al. |

(Continued)

FOREIGN PATENT DOCUMENTS

| EP | 1408637 A1 | 4/2004 |
| FR | 2926691 A1 | 7/2009 |

(Continued)

OTHER PUBLICATIONS

ETSI EN 302 307 v1.2.1, "Digital Video Broadcasting (DVB); Second generation framing structure, channel coding and modulation systems for Broadcasting, Interactive Services, News Gathering, and other broadband satellite applications (DVB-S2)" [online]. ETSI, Aug. 2009 [retrieved on Oct. 28, 2014] <http://www.etsi.org>.*

*Primary Examiner* — Nathan Flynn
*Assistant Examiner* — William J Kim
(74) *Attorney, Agent, or Firm* — Baker & Hostetler LLP

(57) ABSTRACT

A communication system using the DVB-S2 standard, and its associated frame structure, comprises at least two users Ui, characterized in that the super-frame ST1 associated with the first user U1 is composed of at least one frame T1 each composed of at least one header, of a data part, the said super-frame ST1 comprising a number d1 of "dummy" variable size frames consisting of s1 slots, the super-frame ST2 associated with the second user U2 is composed of one or more frames T2 each composed of at least one header, of a data part, the said super-frame ST2 comprising a number d2 of "dummy" variable size frames consisting of s2 slots, the system comprises a module NCC adapted for determining the number d1 and the number d2 of dummies to be introduced so that the temporal duration of ST2 is equal to the temporal duration of ST1.

12 Claims, 5 Drawing Sheets

(51) Int. Cl.
*H04N 21/2383* (2011.01)
*H04N 21/438* (2011.01)
*H04N 21/236* (2011.01)
*H04N 21/61* (2011.01)
*H04N 21/6338* (2011.01)
*H04L 27/00* (2006.01)
*H04L 27/22* (2006.01)
*H04L 27/26* (2006.01)
*H04L 27/38* (2006.01)
*H04L 1/00* (2006.01)

(56) References Cited

U.S. PATENT DOCUMENTS

2010/0046415 A1* 2/2010 Kim et al. ............ 370/315
2010/0158091 A1* 6/2010 Kim et al. ............ 375/226
2010/0166008 A1* 7/2010 Hashimoto et al. ........ 370/458

FOREIGN PATENT DOCUMENTS

| WO | 01/26375 A1 | 4/2001 |
| WO | WO2009091931 A1 | 7/2009 |
| WO | 2010/059740 A2 | 5/2010 |

* cited by examiner

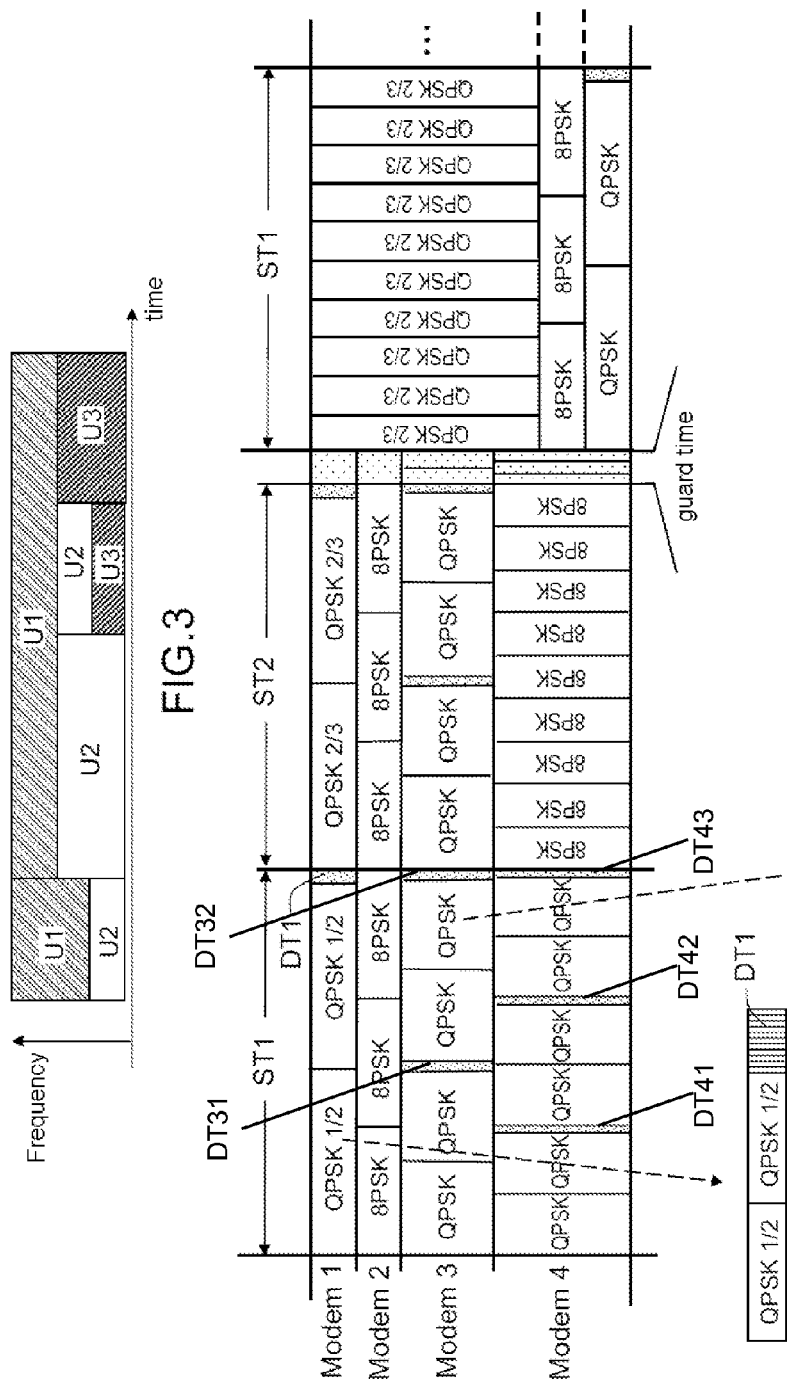

FIG. 6

METHOD AND SYSTEM FOR SYNCHRONIZATION FOR DVB-S2 FRAME AND ITS ASSOCIATED FRAME STRUCTURE

CROSS-REFERENCE TO RELATED APPLICATION

This application claims priority to foreign French patent application No. FR 1203616, filed on Dec. 28, 2012, the disclosure of which is incorporated by reference in its entirety.

FIELD OF THE INVENTION

The invention relates to a system, a method for making it possible to temporally synchronize N DVB-S2 carriers with N greater than or equal to two and an associated frame structure. It lies notably in the field of satellite transmissions, bands C, X, Ku and Ka.

BACKGROUND

Frequency resources are relatively rare and expensive. The deployment of a network consists, inter alia, in calculating as well as possible the bandwidth necessary for each emitter. In operational mode, when an emitter or user does not need their resources, it is opportune that they can lend them to another one that does not have enough resources of its own to transmit all its data. The bitrate peaks of one emitter will thus be absorbed by the bitrate troughs of another.

The DVB-S2 standard has been developed for very-high-bitrate civil applications, for example for television. Once configured, a DVB-S2 carrier operates with a fixed symbol timing, that is to say a fixed bandwidth. The only possible adaptation known to date is to change frame-by-frame the modulation coding pair (MODCOD), this offering the advantage of resisting changes of propagation conditions having a dynamic swing of 15 dB. This adaptive coding & modulation mode is intrinsic to the standard but requires a return channel to inform the DVB-S2 emitter of the propagation conditions seen by the receiver. The MODCOD may differ from one frame to another, and therefore the spectral effectiveness also. In DVB-S2, a normal frame always transports 64800 bits, independently of the MODCOD used. It follows from this that a DVB-S2 frame does not have a number of fixed symbols and therefore a fixed duration. Table 1 gives for the so-called "normal" DVB-S2 frames, the number of symbols according to the modulation and the presence or otherwise of pilot symbols.

|         | Pilotless | With Pilot |
|---------|-----------|------------|
| QPSK    | 32490     | 33282      |
| 8 PSK   | 21690     | 22194      |
| 16 APSK | 16290     | 16686      |

The frames having different durations, it is not currently conceivable to temporally synchronize two DVB-S2 carriers. It is thus not possible to define a frequency plan which demands synchronization of the frames. FIG. 1 shows diagrammatically the distribution over time of the frequencies for several terminals. Thus, the user terminal 1 has a user band B1, the user terminal 2 has a frequency band B2. Each terminal has a pre-allocated band valid for the time of its mission.

The dynamic bitrate adaptation mechanism, known by the abbreviation DRA, may not be deployed in this case, it is therefore not possible for a DVB-S2 network to share its resources.

A solution for remedying this problem could be to constrain all the carriers to a single modulation/pilot pair, for example a pilotless phase shift keying modulation or QPSK (Quadrature phase-shift keying), but the benefit is greatly limited.

The current absence of synchronism in the known systems and methods also prevents the encryption of the DVB-S2 stream with implicit marker or Transec, the techniques of TRANSEC DVB-S2 requiring the transmission of the marker in clear, this being a flaw at the security level.

A need therefore exists to have a system and a method making it possible to obtain dynamic exchange of frequency resources in a system using the DVB-S2 standard, and in fact to have a frame with a suitably adapted structure.

In the subsequent description, the following expressions will be used:

"dummy" frame for mute frame, used when there is no information or data to be transmitted, and "dummy slots" for mute timeslots, Super-frame ST, consisting of several DVB-S2 frames for a user, the frames optionally being separated by "dummy" frames, a super-frame constitutes the base entity for which all the DVB-S2 frames of a user Uk have the same MODCOD, Jumbo-frame JT consisting of several super-frames, a jumbo-frame constitutes the temporal entity for which all the DVB-S2 frames of a user Uk have the same symbol bitrate, the word "slot" defines a timeslot, PSK corresponds to a modulation by change of phase or Phase-Shift Keying, QPSK with 4 PSK, APSK a modulation by change of amplitude or of phase or Amplitude Phase-Shift Keying.

The expression "frame structure of fixed duration" corresponds to a frame structure which exhibits one and the same duration for several users.

SUMMARY OF THE INVENTION

The idea of the present invention relies principally on the definition of a new temporal structure catering notably for the following requirements:

the structure of the DVB-S2 frames must not be modified, so as to have minimum impact on the standard, and consequently on the DVB-S2 existing technological bricks, the duration of the temporal structure must make it possible to be reactive to the needs of the various terminals by rapidly redistributing the satellite resources.

The invention relates to a communication system using the DVB-S2 standard, the said system comprising at least two users U1, U2, a management and control means characterized in that:

the super-frame ST1 associated with the first user U1 is composed of at least one frame T1 composed of at least one header, of a data part, the said super-frame ST1 comprising a number d1 of "dummy" variable size frames consisting of s1 slots, the super-frame ST2 associated with the second user U2 is composed of at least one frame T2 composed of at least one header, of a data part, the said super-frame ST2 comprising a number d2 of "dummy" variable size frames consisting of s2 slots, the said management and control module is adapted for determining the number d1 and the number d2 of "dummy" frames to be introduced so that the temporal duration of ST2 is equal to the temporal duration of ST1.

The "dummy" variable size frames consist, for example, of slots of 90 symbols.

The system can comprise k users Uk and a super-frame ST can be defined by taking account of the minimum band B of the system and the super-frames STk of band nB obtained by multiplying by n the number of frames per super-frames of band B.

The "dummy" slots or mute timeslots are, for example, distributed uniformly in a super-frame.

The "dummy" slots can be distributed at the end of a compound super-frame ST.

The system comprises, for example, a module adapted for introducing a number of mute timeslots between two jumbo-frames.

The system comprises, for example, a module adapted for introducing at the level of the header of a frame a signalling associated with the number of mute timeslots.

The frames are, for example, frames with pilots.

The frames can be QPSK, 8 PSK, 16 APSK, 32 APM frames.

A user of the system is, for example, a drone.

The invention relates to a method for constructing a super-frame intended to be used in a system using the DVB-S2 standard comprising at least two users U1, U2, a management and control means characterized in that it comprises at least the following steps:
  defining a first super-frame ST1 associated with a first user U1 composed of at least one header, of a data part, the said super-frame ST1 comprising a number d1 of "dummy" variable size frames consisting of s1 slots,
  defining a second super-frame ST2 associated with a second user U2 composed of at least one header, of a data part, the said super-frame ST2 comprising a number d2 of "dummy" variable size frames consisting of s2 slots,
  determining the number d1 and the number d2 of dummy frames to be introduced so that the temporal duration of ST2 is equal to the temporal duration of ST1.

A super-frame ST is constructed by executing, for example, the following steps;
  the structure of a super-frame ST is defined for the minimum band B of the system,
  the structure is obtained for the super-frames ST of bands n.B by multiplying by n the number of frames per super-frame of band B.

For a super-frame ST of K slots of 90 symbols, then in the band n.B to obtain the same duration, n.K slots of 90 symbols are introduced.

According to a variant of the method it is possible to supplement a super-frame with mute timeslots.

The invention relates to a frame structure to be used in communication systems using the DVB-S2 standard characterized in that it comprises a number of frames and a number of "dummy" frames disposed so as to obtain a super-frame of fixed duration and in that the duration of the super-frame obtained is identical for several users in communication whatever the allocated band.

BRIEF DESCRIPTION OF THE DRAWINGS

Other characteristics and advantages of the present invention will become more apparent on reading the description given by way of wholly nonlimiting illustration, together with the figures which represent.

DETAILED DESCRIPTION

Figure 1:
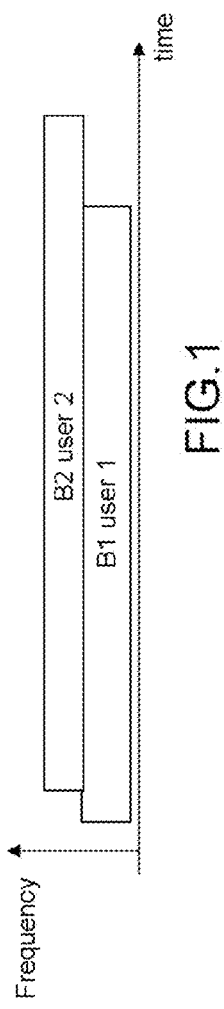
FIG. 1, a representation of the frequency plan for the conventional DVB-S2 standard, FIG. 2, an exemplary system for the construction of a frame structure according to the invention, FIG. 3, a representation of a frequency plan with the use of DVB-S2 frames according to the invention, FIG. 4, a representation of the super-frames and of the jumbo-frames according to the invention, FIG. 5, an exemplary configuration of multi-ACM super-frames, FIG. 6, an exemplary construction of a frequency plan, FIG. 7, an application of the invention to drones.
Figure 2:
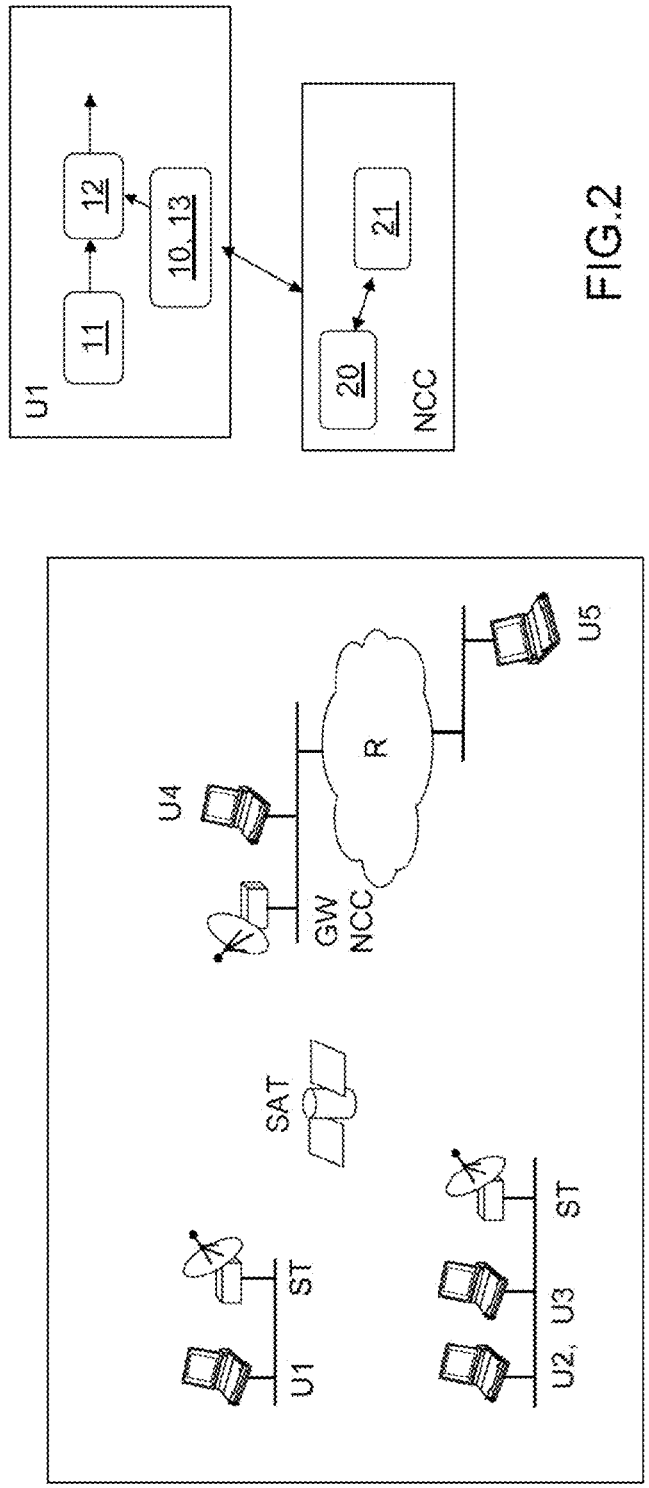

FIG. 2 shows diagrammatically an exemplary system allowing the implementation of the method according to the invention with the aim notably of obtaining a frame structure which will make it possible to dynamically divide the frequency time plane and to allocate it to the various users of the system as a function of their need in terms of bitrate and of their link budget.

The satellite terminals behave as routers for access to the return pathway for the user traffic. The gateway GW of a system centralizes all the traffic in the satellite network and establishes the interconnection between the terrestrial networks. A network control centre NCC unit is charged with the management of the resources of the satellite network. This function can be performed on the ground and coupled to the gateway.

In FIG. 2 are represented several users, U1, U2, ... U5 in connection with a satellite SAT. The users share a total frequency band Btotal. A station Ui has a band Bi which can change according to the frame. During the jumbo-frame JTR1, the station U1 has, for example the band B1 for communication, and the station U2, the band B2. During the second jumbo-frame, the stations U1, U2 may have exchanged their band, U1 using the band B2 and U2 the band B1. The exchange of bands is made between two jumbo-frames JT, whereas the change of modulation coding scheme MODCOD or structure of the super-frame is done between two super-frames ST.

The user U1 comprises for example an emitter/receiver 10, a first communication module 11 allowing the exchanges between stations, for example, a modulator-demodulator 12 having the function of varying the modulation used according to the needs of the user, a module 13 integrated at the emitter/receiver 10 level, receiving the information from the network control centre NCC for the insertion of the additional frames as will be described subsequently so as to obtain structures of frames exhibiting a given temporal duration. The information originating from the NCC is transmitted via the DVB-S2 traffic.

The other users of the system comprise at least the elements and modules described in respect of the first user U1.

The network control centre NCC comprises, for example, means 20 for collecting the loading needs of the users and for distributing the time/frequency slots as a function of the needs of the users. The network control centre NCC also comprises means 21 adapted for defining the number of "dummy" frames to be added at the level of a frame to obtain a fixed temporal structure for all the users over a given time span.

Without departing from the scope of the invention, the presence of an NCC is not indispensable for the operation of the system and of the method. From the moment a user ascertains the temporal length of the ST for a band B, he can construct this ST himself and decide where to insert the dummy frame. There can also be predefined schemes, the latter solution being simpler. As the NCC is the only entity of the system to receive all the information regarding band and C/No needs of the various users, it will indicate to the users which modulation & coding scheme (MODCOD) and which band they must use. It can therefore also indicate the ST structure or a structure identifier, in the case where a common 'dictionary' of ST structure for the system is defined, either in a static or dynamic manner.

FIG. 3 represents an exemplary allotting over time of the frequencies as a function of a user by using DVB-S2 frame structures.

The DVB-S2 "normal" frames are not of the same length according to the type of modulation, for example:
A QPSK frame is made up of 361 slots of 90 symbols;
An 8 PSK frame is made up of 241 slots of 90 symbols.
361 and 241 being mutually prime numbers, the temporal alignment of the frames is not realistic.

In addition to the traffic frames, the DVB-S2 standard provides for "dummy" frames of 37 slots of 90 symbols usable when there is nothing to emit.

The idea of the method according to the invention consists in defining a new type of "dummy" frame of n, with n>0, timeslots or slots, of 90 symbols usable when there is nothing to emit, for a conventional "dummy" frame n=37.

The idea of the method according to the invention consists in inserting at the level of a super-frame ST, a number d of "dummy frames", each having a length $n_i$, so that each user Uk of the system uses a super-frame STk having one and the same duration. The clever insertion of these "dummy" frames makes it possible to temporally align the traffic frames or super-frames mutually in respect of several users and thus to allow the synchronization of several carriers.

FIG. 4 illustrates an application to 4 modems for 4 users who share one and the same frequency band Btotal=7B.
At jumbo-frame N:
the 4 modems each occupy a band:
B for modems 1 and 2
2.B for modem 3
3.B for modem 4
Modem 1 changes coding between ST 1 and ST 2

The dynamic change of frequency and of band is done during the guard time Tg between 2 jumbo-frames. It consists here of "dummy" 'conventional' frame of 37 slots.

In FIG. 4, it is noted that:
for user U1, a "dummy" frame DT1 has been added after the two QPSK ½ frames so as to obtain a super-frame ST1,
for user U2, no "dummy" frame is added,
for user U3, a "dummy" frame DT31 is added after two QPSK frames, and then a second "dummy" frame DT32 is added after two QPSK frames, so that the temporal duration of the whole corresponds to the super-frame ST1,
for user U4, a first dummy frame DT41 is added after two QPSK modulations, and then a second DT42 is added after two QPSK frames, and then a third DT43 is added after two QPSK frames, the whole set of frames and dummy frames forming a super-frame of temporal duration ST1.

The addition of these "dummy" frames DT allows super-frame temporal alignment and enables the dynamic and synchronous sharing of resources between the users Uk. The users, in this example, continue to emit without changing modulation between super-frames STi. However, possible modifications in the type of modulation employed by the users can be performed between 2 super-frames.

Together, the set of two super-frames ST1 and ST2 forms a jumbo-frame JT. Between two jumbo-frames a guard time Tg is introduced which will be used to allow possible modifications in the band Bk employed by the users Uk, of the band exchanges.

At jumbo-frame N+1:
modem 4 no longer emits
the other 3 modems each occupy a band:
5.B for modems 1
B for modem 2 and 3

This solution offers a temporal alignment of super-frame ST2 and of jumbo-frame JT for all the users. It enables the dynamic and synchronous sharing of resources between the DVB-S2 emitters, the modification introduced affecting only the dummy frames with respect to the DVB-S2 norm.

By generalizing the example given in FIG. 3, the steps allowing the construction of a super-frame ST according to the invention are described hereinafter.

The structure of a super-frame ST is defined for the minimum band B of the system,
the structure for the super-frames ST of bands n.B is obtained by multiplying by n the number of frames per super-frame of band B, for example if in the band B there is a super-frame ST of K slots of 90 symbols, then in the band n.B to obtain the same duration requires n.K slots of 90 symbols, The length of a "dummy" frame introduced to obtain the super-frame structure of "fixed" duration according to the invention is a multiple of 90 symbols corresponding to the DVB-S2 slot.

The super-frame supplement is added through "dummy" slots.

The super-frames ST must last the same time for the various users Uk whatever the allocated band (n.B).

In order of priority, for example, the supplemented DVB-S2 super-frames are STs consisting of:
1. Frame with pilots,
2. QPSK frame, then 8 PSK then 16 APSK and finally 32 APSK frame For the band B, the guard time Tg of a jumbo-frame is preferably effected by inserting a 'conventional' "dummy" frame (MODCOD=0).

Depending on the configuration, the distribution of the "dummy" slots can be effected uniformly within a super-frame or at the end of the Super-frame.

The examples which have just been given can apply in respect of so-called normal frames or short frames, comprising pilots or otherwise.

Algorithm for Determining "Dummy" Slots

The general case takes into account the cohabitation of the STs with pilots and STs without pilots.

There are 8 possible types of ST denoted $ST_{m,P}$
m: order of the modulation (2 for QPSK, 3 for 8 PSK . . . )
P: 0: without pilot, 1 with pilot
Example: $ST_{4,1}$=ST 16 ASPK with pilot.

During configuration of the system it must be possible to limit oneself to just certain types of ST (for example cohabitation of $ST_{2,0}$ and $ST_{3,1}$ only).

In the same manner, the DVB-S2 frames are denoted $T_{m,P}$

By limiting oneself to the types of ST desired, the algorithm for parametrizing the STs follows, for example, the following steps:

Step 1. Calculation of $N_{Tn\_min,1}$: number of frames with pilot of smallest order ($T_{n\_min,1}$)
$N_{Tn\_min,1}$ must be a multiple of 5 so as to have a multiple of 90 symbols (the number of pilots per frame is a multiple of 36).

$L_{Tn\_min,1}$: number of symbols of the frame $T_{n\_min,1}$

If in the chosen configuration there is no ST with pilot then $N_{Tn\_min.1}=0$ hereinafter in the algorithm.

Step 2. Calculation of the $N_{Tn\_max.0}$: number of pilotless frames of largest order ($ST_{n\_max.0}$):

$N_{Tn\_max.0}$ smallest integer such that $N_{Tn\_max.0}$ $*L_{Tn\_max.0} > N_{Tn\_min.1}*L_{Tn\_min.1}$ $L_{Tk\_max0}$ number of symbols per frame without pilot of modulation of highest order ($T_{k\_max0}$)

$L_{STk\_max0}=N_{Tn\_max.0}\cdot L_{Tk\_max0}$ is the number of symbols per ST. Since $L_{Tk\_max0}$ is a multiple of 90 so is $L_{STk\_max0}$.

Step 3. We deduce for the other types of frames ($T_{nP}$)
with pilot
their number $N_{Tn.1}=$integer_part($L_{STk\_max0}/(5*L_{Tn1})$) $*5\rightarrow$this guarantees that the number of pilotless frames per ST is a multiple of 5 without pilot
their number $N_{Tn.0}=$integer_part($L_{STk\_max0}/L_{Tn0}$)

Step 4. Calculation of the number $D_{STnP}$ of "dummy" slots of 90 symbols to supplement the $ST_{nP}$ $$D_{STnP}=(L_{STk\_max0}-N_{Tn.P}*L_{TnP})/90$$

$$D_{STn\_max0}=0$$

If for one and the same modulation the number of frames per ST without pilot is equal to the number of frames per ST with pilot then it is necessary to choose a larger value of N.

This algorithm gives the number of "dummy slots" per ST but it does not give their distribution in the ST. This distribution can be free starting from the moment that the emitter can indicate to the receiver the number of "dummy" slots that it emits in a new "dummy" DVB-S2 frame.

A few examples of mixed QPSK/8 PSK Super-frames ST will now be given.

An exemplary super-frame is given in table 2 mixing QPSK or 8 PSK modulation frames with or without pilot. The minimum number of QPSK pilotless frames per super-frame is, in the example represented in table 2 for a mixed QPSK/8 PSK ST of 347040 symbols/ST, 10 frames per ST.

|  |  | QPSK | 8PSK |
|---|---|---|---|
| Pilot | No. of Frames | 10 | 15 |
|  | Dummy No. of Slots (header included) | 158 | 157 |
| No Pilot | No. of Frames | 10 | 16 |
|  | Dummy No. of Slots (header included) | 246 | 0 |

It is possible to improve the effectiveness of the temporal alignment of the STs when the number of dummy slots to be added to the ST is greater than those of short frames (a pilotless QPSK frame has 91 slots) by supplementing the pilotless QSPK frame, for example, with 2 pilotless QPSK short frames and only 54 "dummy" slots; or else frames of any other type.

By having an ST based on a structure with 30 QPSK frames with pilot the effectiveness is better on account of the presence of more frames without pilot than with pilot for one and the same type of modulation, we obtain table 3, mixed QPSK/8 PSK ST of 1 Msymbol/ST:

|  |  | QPSK | 8PSK |
|---|---|---|---|
| Pilot | No. of Frames | 30 | 45 |
|  | Dummy No. of Slots (header included) | 233 | 228 |
| No Pilot | No. of Frames | 31 | 46 |
|  | Dummy No. of Slots (header included) | 136 | 0 |

Another example is given in table 4 where the idea is to combine within one and the same ST frames of different modulation so as to have an optimal multi-ACM. The example of table 4 illustrates this idea with the mixing of QPSK frames and 8 PSK frames.

| Multi-ACM configuration | | 0 | 1 | 2 | 3 | 4 |
|---|---|---|---|---|---|---|
| QPSK | No. of Frames | 0 | 2 | 4 | 6 | 8 |
| 8PSK | No. of Frames | 12 | 9 | 6 | 3 | 0 |
| Dummy | No. of Slots (header included) | 0 | 1 | 2 | 3 | 4 |
| No. of Symbols | | | | 260280 | | |

Figure 5:
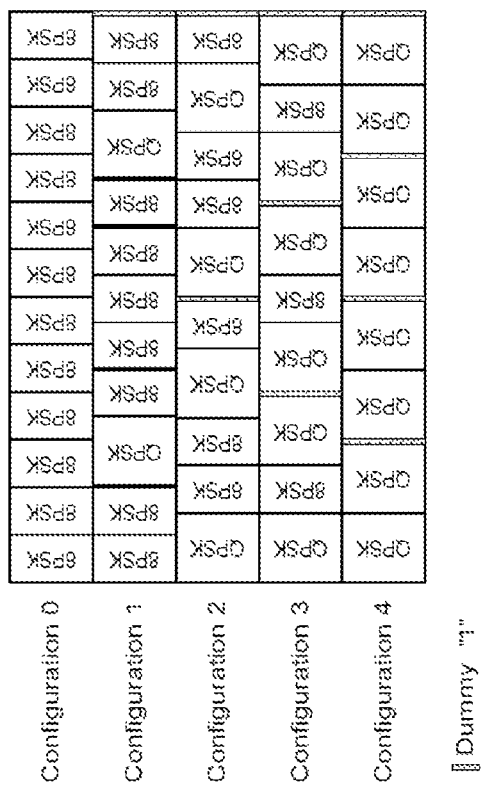

For each configuration it is possible to construct the structure of the STs by uniformly distributing the frames of like modulation so as to limit the jitter, as is represented in FIG. 5.

The type of "dummy" frame used to temporally supplement an ST is a dummy frame of a single slot reduced to the header of the Physical frame (PLHeader) (dummy "1"). This dummy "1" frame is repeated as a function of the ACM configurations. It is beneficial to dedicate this type of multi-ACM ST for the NCC in a starred topology.

The DVB-S2 standard defines "dummy" frames of 37 slots (header and 36 dummy slots). In order to allow a receiver to recognize a frame according to the invention, it is possible to use the signalling PLS included in the PLHeader of the DVB-S2 frame to indicate to the receiver the number of "dummy slots" which are transmitted in the current frame.

Recall that the PLS is composed of 2 fields:
  MODCOD (5 bits): identifies the modulation and the code rate of the frame:
  TYPE (2 bits): identifies the type of frame (normal/short) and the presence/absence of pilot symbols. Field not relevant for a "dummy" frame.

The MODCOD field has 3 reserved values (as well as a 4th to indicate that the frame is a conventional "dummy" frame). These 3 values, combined with the TYPE field, makes it possible to define 12 types of "dummy" frame in addition to the conventional "dummy" frame.

In order to allow a DVB-S2 receiver to decode any DVB-S2 carrier whatsoever without knowing a priori the modulation and the coding of the carrier it is possible to modify the PLS field as indicated in table 5 (extension of the PLS field) below:

| Mode | MODCOD | TYPE | No. of Slots (header included) |
|---|---|---|---|
| "Dummy" 1 | 29 | 00 | 1 |
|  |  | 01 | 2 |
|  |  | 10 | 4 |
|  |  | 11 | 8 |
| "Dummy" 2 | 30 | 00 | 16 |
|  |  | 01 | 32 |
|  |  | 10 | 64 |
|  |  | 11 | reserved |
| "Dummy" 3 | 31 | 00 | reserved |
|  |  | 01 | reserved |
|  |  | 10 | reserved |
|  |  | 11 | reserved |
| "Conventional" dummy | 0 | — | 37 |

The objective of the implementation of synchronous DVB-S2 framing is to be able to implement the DRA dynamic adaptation mechanism between various carriers.

Examples of Implementation.

Jumbo-Frame and Super-Frames without Pilot.

For a system which requires only frames without pilots (typically fixed system with equipment whose phase noise is low), one deduces therefrom the type of "dummy" frame required in order to supplement the super-frames. Table 6 hereinbelow gives an exemplary structure of super-frames whose modulation is at best 16 APSK:

|  | QPSK | 8PSK | 16 APSK |
|---|---|---|---|
| No. of Frames | 2 | 3 | 4 |
| Dummy | "2" | "1" |  |
| Total No. of symbols (No. of slots) |  | 65160 (724) |  |
| Effectiveness | 99.72% | 99.86% | 100% |

At the minimum bitrate a jumbo-frame is composed of:
  8 Super-frame
  a guard time composed of a 'conventional' "dummy" frame (overflow or overhead of 0.6%)
1) i.e. a total of 524610 (8*65160+37*90) symbols.
2) At a symbol frequency of 524.61 kHz the duration of a jumbo-frame is 1 s. Jumbo-frame and super-frames with Pilot With ACM-like systems, the "pilot" symbols can be inserted into the physical layer frame structure to facilitate synchronization and also for channel estimation purposes.

The previously applied principle is employed again for the frames with pilots. However, the number of pilot symbols per frame is not a multiple of 90:
  22 blocks of 36 symbols in QSPK
  14 blocks of 36 symbols in 8 SPK
  11 blocks of 36 symbols in 16 ASPK
To have a multiple of 90 symbols per ST therefore requires a minimum of 5 frames with pilots (5*36=2*90 . . . ).

The type of "dummy" frame that is required in order to supplement the super-frames is given in table 7 which gives an exemplary structure of super-frames whose modulation is at best 16 APSK, DVB-S2 system with ST with pilot with modulation with 4 states maximum (16 APSK):

|  | QPSK | 8PSK | 16 APSK |
|---|---|---|---|
| No. of Frames | 10 | 15 | 20 |
| Dummy | "10" | "9" |  |
| Total No. of symbols (No. of slots) |  | 333720 |  |

In order not to impact the ACM functionality inherent to DVB-S2 it is preferable to have an ST of the order of a few 100 ms (typically 250 ms). For an ST with 250 ms pilot this imposes a minimum bitrate of 1.33 Mbauds. At the minimum bitrate a jumbo-frame of 1 second is composed of:
  4 Super-frames,
  a guard time composed of a 'conventional' "dummy" frame (overflow of 0.6%)

For mobility applications the 16-APSK modulations will certainly not be used. The structure of the ST can therefore be optimized by decreasing the size of the "dummy" frames of supplements in table 8:

|  | QPSK | 8PSK |
|---|---|---|
| No. of Frames | 10 | 15 |
| Dummy | "1" |  |
| Total No. of symbols (No. of slots) |  | 332910 |

Application to Drones

An exemplary application requiring a high bitrate is the drone where typically the expected bitrate is of the order of some ten Mbits. Accordingly during mission preparation the mission operator must allocate (and reserve at the satellite level) a frequency band for his need i.e. a few MHz. If this same operator now has several drones which are flying simultaneously he must reserve several frequency bands (a priori one for each drone). For each MHz allocated to a drone the operator will also have to reserve the equivalent satellite resource and of course pay for it (fairly expensive 5 k$/MHz/month).

If a drone has nothing to transmit it is economically desirable for it to be able to "lend" its bandwidth to another drone which needs it by using the mechanism for dynamic sharing of resources.

Example of Super-Frames

For mobile and/or tactical applications of this type, in the majority of cases the link budgets limit the DVB-S2 carriers to the QSPK and 8 PSK MODCOD. Moreover, in applications of mobility type it is also necessary to be resistant to the Doppler effect. To cater for these problem areas an ST is always defined either with pilots and QPSK frames ($ST_{2,1}$) or else 8 PSK frames ($ST_{3,1}$).

In this case a possible base configuration is given in table 9: ST mixed QPSK (SSP)/8 PSK (AP) of 227430 symbols/ST.

|  |  | $ST_{2,1}$ | $ST_{3,1}$ |
|---|---|---|---|
| No. of Frames/ST |  | 15 | 10 |
| Dummy | No. of Slots (header included) | 1 | 0 |
| No. of Symbols/ST |  | 332910 |  |

At a minimum bitrate of 1 Mbaud an ST lasts 333 ms.
At the minimum bitrate a jumbo-frame of 1 second is composed of:
- 3 Super-frame
- a guard time composed of a 'conventional' "dummy" frame (overflow of 0.6%)

In practice:
- the carrier of the NCC is certainly fixed-band since the terminals must be able to synchronize with the NCC.
- the NCC emits its signalling on QPSK ¼ frames (optimal protection). However, it is not truly conceivable that the NCC emits solely in QPSK.→It is preferable to specify multi-ACM STs.

A possible multi-ACM configuration is given in table 10:

| Multi-ACM configuration | | 0 | 1 | 2 | 3 |
|---|---|---|---|---|---|
| Frame 2,1 | No. of Frames | 10 | 7 | 4 | 0 |
| Frame 3,1 | No. of Frames | 0 | 4 | 8 | 15 |
| Dummy | No. of Slots (header included) | 1 | 123 | 246 | 0 |
| No. of Symbols/ST | | | 332910 | | |

Figure 6:
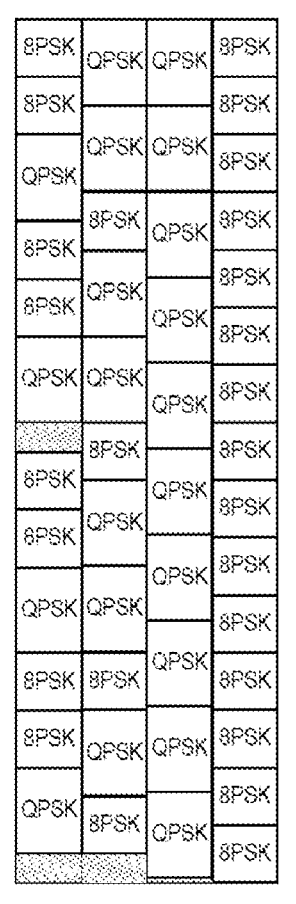

In the TF plane this can be constructed as illustrated in FIG. 6.

The NCC carrier being a priori fixed-band it would be possible to use a "conventional" DVB-S2 carrier which is not synchronous with the other carriers of the network. However, to synchronize the terminals with one another each terminal must first synchronize with the NCC and therefore with a synchronous DVB-S2 carrier.

Figure 7:
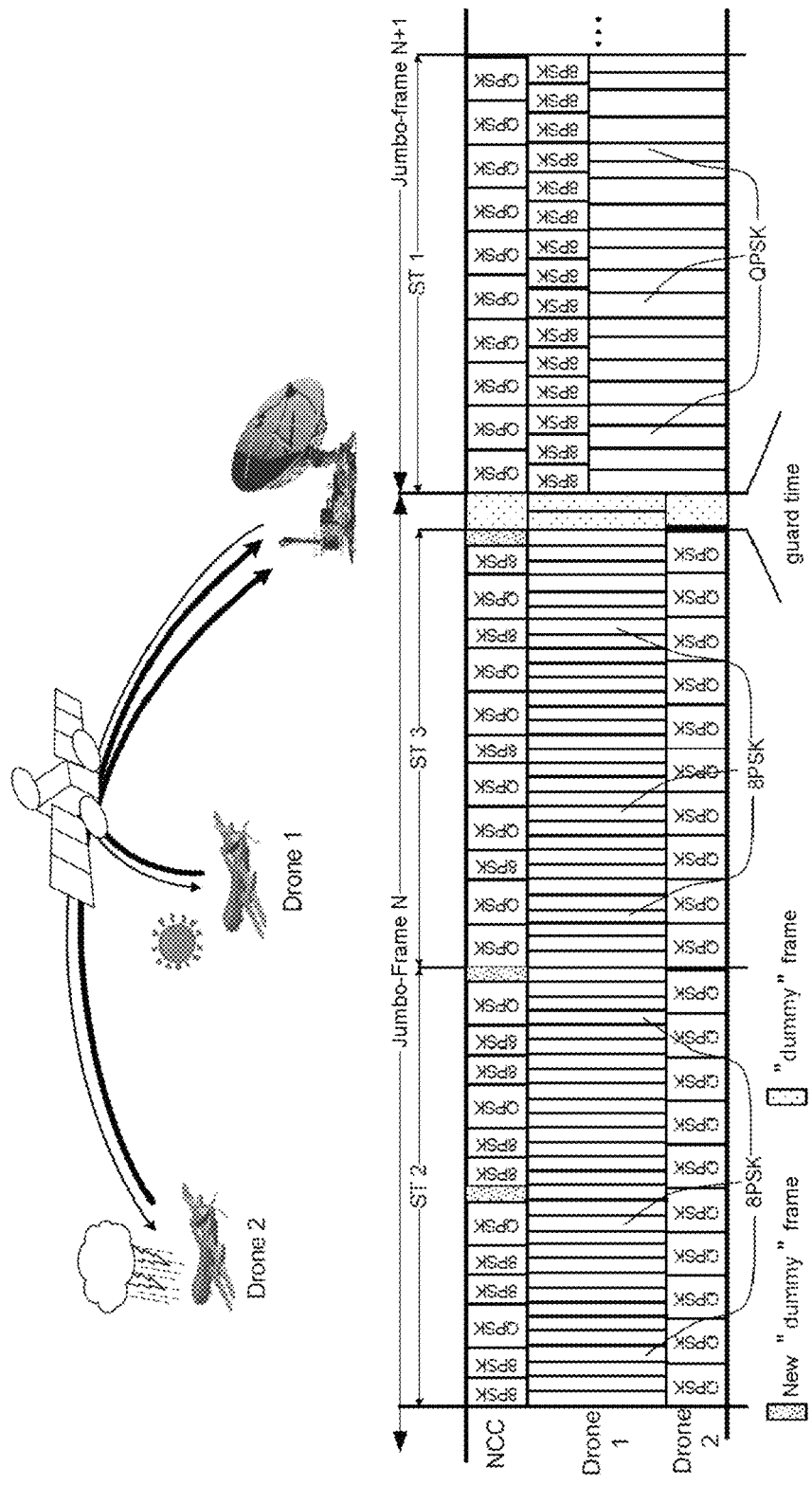

A possible use of the frames as a function of the needs of the terminals and of the propagation conditions is illustrated in FIG. 7:
- Jumbo-frame N: the propagation conditions are
  - good for drone 1: frames Tx (towards the NCC) and Rx (from the NCC) in 8 PSK
  - bad for drone 2: frames Tx (towards the NCC) and Rx (from the NCC) in QPSK
- ST 2:
  - NCC emits more bitrate destined for drone 1 (8 PSK frame)
  - Drone 1 is on mission→a great deal of data and therefore more allocated band
  - Drone 2 is "en route"→little data and therefore little allocated band
- ST 3:
  - NCC emits at about the same bitrate destined for the 2 drones→2 times as many QSPK frame (for drone 2) as 8 PSK frame (for drone 1)
  - Drone 1 is on mission→a great deal of data and therefore more allocated band
  - Drone 2 is "en route"→little data and therefore little allocated band
- Jumbo-frame N+1: the propagation conditions are
  - less good for drone 1: frames Tx (towards the NCC) and Rx (from the NCC) in QPSK
  - still bad for drone 2: frames Tx (towards the NCC) and Rx (from the NCC) in QPSK
- ST 1:
  - Drone 1 has finished its mission→little data and therefore little allocated band
  - Drone 2 begins its mission→more data and therefore more allocated band.

The temporal structure of the frames according to the invention makes it possible notably to succeed in temporally synchronizing the DVB carriers with one another and to define a time reference. The introduction of "dummy" frame of variable size makes it possible to structure the DVB-S2 carriers as jumbo-frame and super-frame and thus to mutually synchronize several DVB-S2 carriers.

The dynamic sharing of resources allows some saving in bandwidth.

The invention claimed is:

1. A communication system using the DVB-S2 standard, the system comprising:
   a first transceiver U1 and a second transceiver U2, wherein:
   a first super-frame ST1 associated with the first transceiver U1 comprises:
   at least one first frame T1 comprising at least one first header and a first data part, and
   a number d1 of first dummy variable size frames comprising s1 slots, a second super-frame ST2 associated with the second transceiver U2 comprises:
   at least one second frame T2 comprising at least one second header and a second data part, and
   a number d2 of second dummy variable size frames comprising s2 slots;
   a controller configured to determine the number d1 of the first dummy variable size frames within the first super-frame ST1 and the number d2 of the second dummy variable size frames within the second super-frame ST2 so that a second temporal duration of the second super-frame ST2 is equal to a first temporal duration of the first super-frame ST1; and
   k transceivers Uk and k super-frames STk based on a minimum band B of the communication system, wherein the super-frames STk of band nB are determined by multiplying n by a number of frames per super-frame of the minimum band B, where k is a positive integer greater than or equal to two and n is a positive integer greater than zero that depends on time.

2. The communication system according to claim 1, wherein the s1 slots and the s2 slots of the first and second dummy variable size frames comprise 90 symbols.

3. The communication system according to claim 1, wherein the s1 slots of the first dummy variable size frames are distributed uniformly in the first super-frame ST1, and the s2 slots of the second dummy variable size frames are distributed uniformly in the second super-frame ST2.

4. The communication system according to claim 1, wherein the s1 slots of the first dummy variable size frames and the s2 slots of the second dummy variable size frames are distributed at the end of a compound super-frame ST.

5. The communication system according to claim 1, further comprising a module configured to introduce a predetermined number of dummy slots between two jumbo-frames.

6. The communication system according to claim 1, further comprising a module configured to introduce signaling associated with a number of s1 slots into the at least one first header, or introduce signaling associated with a number of s2 slots into the at least one second header.

7. The communication system according to claim 1, wherein the first and second dummy variable size frames comprise pilots.

8. The communication system according to claim 1, wherein the first and second dummy variable size frames are QPSK, 8 PSK, 16 APSK, or 32 APM frames.

9. The communication system according to claim 1, wherein the first transceiver U1 or the second transceiver U2 is a drone.

10. A method for constructing a super-frame for use in a communication system using the DVB-S2 standard, the communication system comprising a first transceiver U1 and a second transceiver U2, and a controller, the method comprising:
- defining a first super-frame ST1 associated with the first transceiver U1, the first super-frame ST1 comprising at least one first header, a first data part, and a number d1 of first dummy variable size frames comprising s1 slots,
- defining a second super-frame ST2 associated with the second transceiver U2, the second super-frame ST2 comprising at least one second header, a second data part, and a number d2 of second dummy variable size frames comprising s2 slots,
- determining, by the controller, the number d1 of the first dummy variable size frames within the first super-frame ST1 and the number d2 of the second dummy variable size frames within the second super-frame ST2 so that a second temporal duration of the second super-frame ST2 is equal to a first temporal duration of the first super-frame ST1, and
- constructing the first super-frame ST1 and the second super-frame ST2 by:
  - defining a structure of the first super-frame ST1 and the second super-frame ST2 based on a minimum band B of the communication system, and
  - obtaining the structure of the first super-frame ST1 and the second super-frame ST2 for each of bands n.B by multiplying n by a number of frames per super-frame of the minimum band B, where n is a positive integer greater than zero that depends on time.

11. The method according to claim 10, wherein for the first super-frame ST1 or the second super-frame ST2 of K slots of 90 symbols, in the band n.B, n.K slots of 90 symbols are introduced to obtain the same duration.

12. The method according to claim 10, further comprising supplementing the first super-frame ST1 with the s1 slots, and supplementing the second super-frame ST2 with the s2 slots.

* * * * *